United States Patent
Wallace (10) Patent No.: US 10,340,789 B2
(45) Date of Patent: Jul. 2, 2019

(54) DYNAMIC THRESHOLD SELECTION FOR TRANSIENT DETECTION IN A COVERTER

(71) Applicant: Texas Instruments Incorporated, Dallas, TX (US)

(72) Inventor: Ryan Lee Wallace, Plainfield, IL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/395,655

(22) Filed: Dec. 30, 2016

(65) Prior Publication Data
US 2018/0191242 A1  Jul. 5, 2018

(51) Int. Cl.
| | | |
|---|---|---|
| H02M 3/156 | (2006.01) | |
| H02M 3/04 | (2006.01) | |
| H02M 1/32 | (2007.01) | |
| H02M 3/158 | (2006.01) | |
| H02M 1/00 | (2006.01) | |

(52) U.S. Cl.
CPC .............. *H02M 3/04* (2013.01); *H02M 1/32* (2013.01); *H02M 3/156* (2013.01); *H02M 3/158* (2013.01); *H02M 2001/0003* (2013.01); *H02M 2003/1566* (2013.01)

(58) Field of Classification Search
CPC ......... H02M 2003/1566; H02M 3/156; H02M 3/158
See application file for complete search history.

(56) References Cited

U.S. PATENT DOCUMENTS

| | | | |
|---|---|---|---|
| 9,348,345 B2 | 5/2016 | Lynch et al. | |
| 2006/0022653 A1* | 2/2006 | Reed | H02M 3/158 323/282 |
| 2009/0237854 A1* | 9/2009 | Mok | H02M 3/156 361/111 |
| 2011/0254527 A1* | 10/2011 | Saito | G05F 1/56 323/284 |
| 2014/0070784 A1 | 3/2014 | Lynch et al. | |
| 2017/0012541 A1* | 1/2017 | Ye | H02M 1/4258 |

FOREIGN PATENT DOCUMENTS

CN    103683907 A    3/2014

OTHER PUBLICATIONS

Wallace, R., "RAMP_COMP_INTRSCT.sxcmp"; Schematic for the Ramp Comp Intersect; Aug. 17, 2015; 3 pages.

* cited by examiner

*Primary Examiner* — Yusef A Ahmed
*Assistant Examiner* — Ishrat Jamali
(74) *Attorney, Agent, or Firm* — Andrew Viger; Charles A. Brill; Frank D. Cimino (57) ABSTRACT

A dynamic threshold determining circuit changes the threshold voltage used to determine when to inject additional energy to increase a power converter's output voltage in response to a low voltage transient for the converter. By being able to change the threshold, finer control of the energy input for correcting transients is possible. In one implementation, the threshold is closer to the target voltage than a typical static threshold value used for transient correction, and the energy injected is smaller than that typically used for transient correction. Thus, the power converter will have a fast response to a transient but be less likely to overshoot the correction. Should the transient continue, the threshold can be changed to move further from the target value while an increased amount of energy is added so that the system can dynamically move to correct bigger transients.

21 Claims, 12 Drawing Sheets

DYNAMIC THRESHOLD SELECTION FOR TRANSIENT DETECTION IN A COVERTER

TECHNICAL FIELD

This invention relates generally to power converters and more specifically to direct current (DC) to DC power converters.

BACKGROUND

Power converters are used in a variety of settings to convert electrical power from one form to another. One known type power converter is a DC to DC power converter, which takes a direct current power having a set voltage and converts that signal to a different set voltage. A power converter's performance can be affected by a variety of factors. For instance, the circuitry that receives the power converter's output may influence its behavior to draw more or less current from the power converter, which can change the output voltage from the power converter's target output voltage. Such changes in the converter's output are called transients. Transients can cause a variety of problems for the circuitry powered by the power converter, including causing a hard reset for the device if the converter's output power drops too low.

To compensate for transients that drop the converter's output voltage, extra energy is added to boost the output. The boost is triggered by sensing that the output drops below a particular threshold. The boost, however, can overshoot the converter's target voltage, i.e., causing the voltage to go significantly above the target output voltage. Another problem with certain correction approaches is the improper injection of energy during a false triggering, where the output voltage only very briefly drops below the threshold and then quickly self-corrects. An injection of energy in this situation almost certainly results in overshooting the target voltage. Still another problem with certain approaches is where the energy injections result in oscillation of the output that may cause harmful harmonic effects for the circuitry that receives the converter's voltage output.

SUMMARY

Generally speaking, pursuant to these various embodiments, a dynamic threshold determining circuit changes the threshold voltage used to determine when to inject additional energy to increase a power converter's output voltage in response to a low voltage transient for the converter. By being able to change the threshold, finer control of the energy input for correcting transients is possible. In one implementation, an initial threshold is closer to the target voltage than a typical static threshold value used for transient correction, and the initial energy injected is smaller than that typically used for transient correction. Thus, the power converter will have a fast response to a transient but be less likely to overshoot the correction. Should the transient continue in this example, the threshold can be changed to move further from the target value and an increased amount of energy is added so that the system can dynamically move to correct bigger transients. These and other benefits may become clearer upon making a thorough review and study of the following detailed description.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
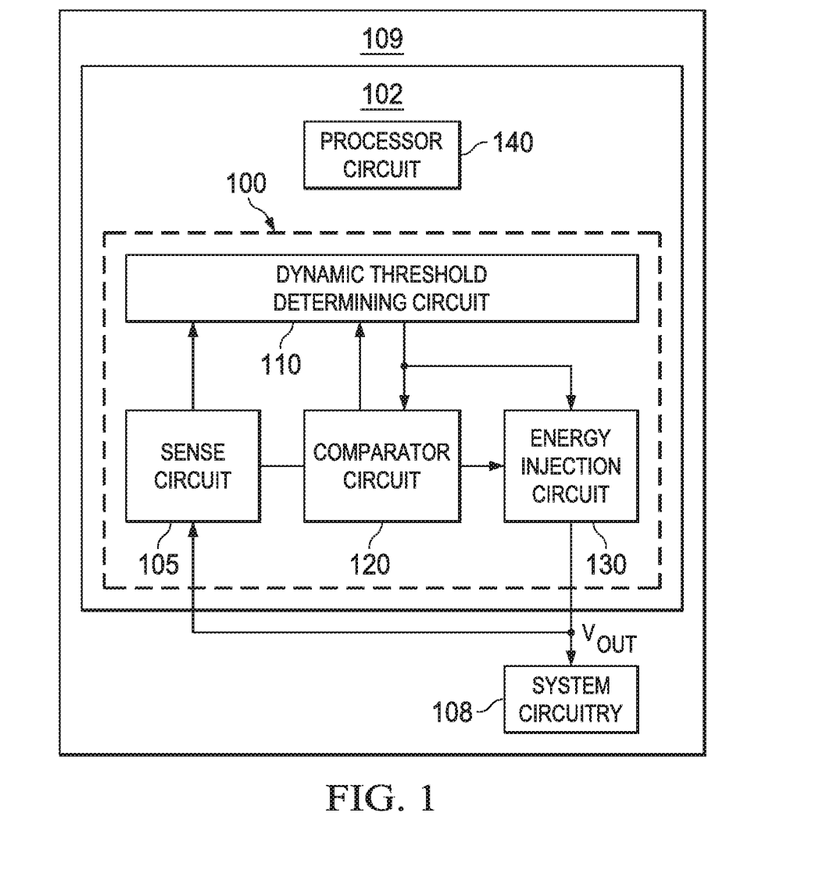
FIG. 1 comprises a block diagram of an example circuit as configured in accordance with various embodiments of the invention.

Referring now to the drawings, and in particular to FIG. 1, an illustrative circuit that is compatible with many of these teachings will now be presented. The circuit 100 for use with or as part of a converter circuit 102, such as a DC to DC power converter, includes a sense circuit 105 connected to receive and detect a voltage output signal $V_{out}$ of the converter circuit 102 and to provide a sense signal corresponding to the voltage output signal. The voltage output powers system circuitry 108 that is part of a larger device or system 109. The sense circuit 102 typically includes a voltage detection circuit, comparator circuit, or similar structure to determine the voltage provided by the converter circuit 102. The circuit 100 also includes a dynamic threshold determining circuit 110 configured to provide a dynamic threshold signal. A comparator circuit 120 is connected to receive and compare the sense signal to the dynamic threshold signal and to output an injection enable signal in response to the sense signal exceeding the dynamic threshold signal. The comparator circuit 120 is configured to switch off the injection enable signal in response to the sense signal being lower than the dynamic threshold signal. It will be understood that the terms "exceeding" and "lower than" as used here are to indicate relative crossings only and do not necessarily mean only numerically greater or lower than.

The circuit 100 further includes an energy injection circuit 130 configured to inject additional energy to increase voltage of the voltage output signal in response to the injection enable signal. The amount of the additional energy is based at least in part on the dynamic threshold signal. The energy injection circuit 130 can change the amount of additional energy by changing a voltage or current amount applied or by changing a frequency at which the additional energy is applied. For example, if the energy is input through pluses such as a pulse modulated input, an increase in the frequency of the pulses will increase the amount of energy input to the system. Energy injection circuits are generally known in the art, and the teachings herein relate to how to better control such energy injection circuits.

Figure 2:
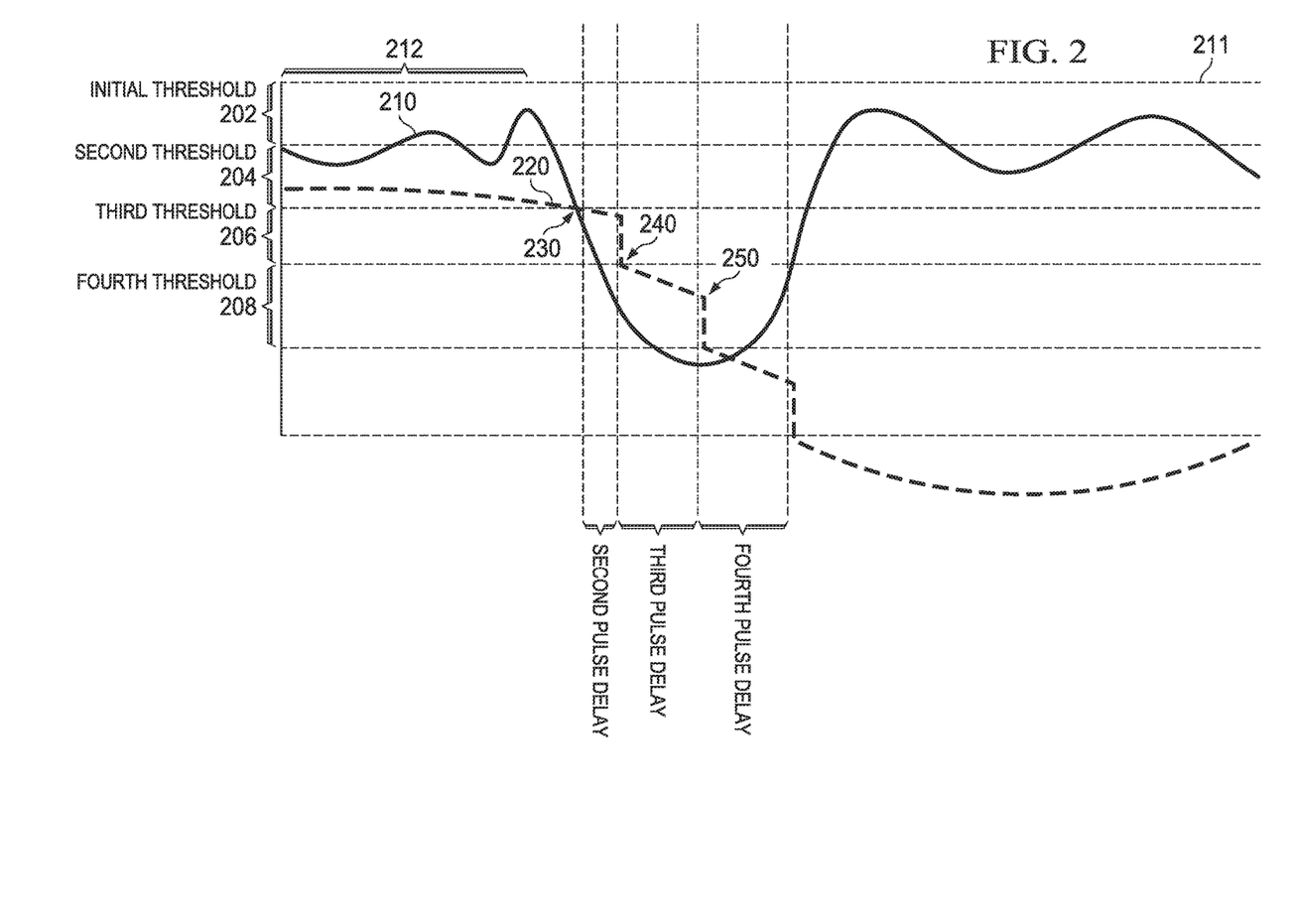
FIG. 2 comprises a graph illustrating a voltage output as compared to a dynamic threshold as configured in accordance with various embodiments of the invention.

An example implementation of the dynamic threshold determining circuit will be described with respect to FIGS. 1 and 2. In this example, an initial dynamic threshold signal is set to be no more than 10% lower than the target voltage output signal and set to account for acceptable ripple during normal operation for the voltage output signal. Typically, the output voltage for a DC to DC converter will vary by a small amount, which variance is called a ripple. Triggering an energy injection in response to normal ripple will likely cause an overshoot in the correction because normal ripple self corrects. In FIG. 2, line 210 represents the output voltage or a sense signal corresponding to the output voltage. For simplicity, line 210 will be referred to the output voltage in this description. The output voltage 210 of FIG. 2 demonstrates a normal ripple at portion 212. One of ordinary skill will recognize that the size of a normal ripple in such circuits will vary based on the type of converter and operating environment for the converter. Despite the desire to avoid reacting to normal ripple, it is also desirable to set the initial dynamic threshold signal as closely as possible to the target voltage output signal, such as no more than 10% lower than the target voltage output signal, so as to have a fast response to a transient event.

In the example of FIG. 2, four separate thresholds 202, 204, 206, and 208 are illustrated. In one approach, the dynamic threshold signal as discussed herein can be these individual set values such that the dynamic threshold signal simply steps from one to the next such that dynamic threshold determining circuit decreases the dynamic threshold signal over a series of steps. In another approach, illustrated by line 220, the dynamic threshold signal may be a combination of a running average of the compensation signal used to bring the voltage output signal 210 closer to the target voltage output signal 211 or a running average of the variance of the voltage output signal 210 from the target voltage output signal 211 plus a further dynamic adjustment such as the above noted stepwise approach. The dynamic threshold signal could be varied linearly or by other method in other approaches as well.

In any one of these approaches, if one starts with normal operating conditions, the comparator circuit 120 compares the output voltage 210 to the initial dynamic threshold signal (depending on the approach of FIG. 2, either the set initial threshold 202 or the moving threshold 220). When the output voltage 210 drops below the initial dynamic threshold signal 202, 220 such as illustrated at point 230, the injection enable signal triggers the energy injection circuit 130 to inject additional energy to try to bring the voltage output signal 210 back to the target voltage output signal 211. In response to receiving the injection enable signal, the dynamic threshold determining circuit 110 decreases the dynamic threshold signal to the second threshold 204 or by stepping down the moving dynamic threshold signal 220 at point 240. This stepping down may occur after a delay (illustrated in FIG. 2 as the second pulse delay between points 230 and 240) to allow time for the voltage output signal to move in response to the injection of additional energy, and such a delay may be inherent to the circuit where the threshold is moved in conjunction with certain circuit cycles (such as a pulse width modulation cycle) used by the circuit to control injection of energy to the voltage output.

In the example of FIG. 2, after a set time such as one operation cycle of the circuit, the comparator circuit 120 again compares the voltage output signal 210 to the dynamic threshold signal 204, 220 and again determines that the voltage output signal 210 is below the dynamic threshold signal and outputs the injection enable signal. Accordingly, the energy injection circuit 130 again injects additional energy to increase voltage of the voltage output signal 210. In this case, the additional energy may be increased based on the relatively lower setting for the dynamic threshold signal. Further, in response to receiving the injection enable signal, the dynamic threshold determining circuit 110 again decreases the dynamic threshold signal to the third threshold 206 or by stepping down the moving dynamic threshold signal 220. In this case, the illustrated third delay between the steps at points 240 and 250 may be intentionally set to be longer than the second delay pulse between points 230 and 240 because having a short second delay pulse can increase the responsiveness of the circuit to a transient event.

The process repeats itself again at point 250 where again the comparator circuit 120 compares the voltage output signal 210 to the dynamic threshold signal 206, 220 and again determines that the voltage output signal 210 is below the dynamic threshold signal and outputs the injection enable signal. Now, however, the voltage output signal 210 responds to the injection of additional energy and moves toward the target voltage output signal 211. When combined with a further decrease in the dynamic threshold signal 220 in response to the further sending of the injection enable signal, the voltage output signal is now higher than the dynamic threshold signal 220 at point 260. Accordingly, the comparator circuit 120 switches off the injection enable signal in response to the sense signal or voltage output signal 210 being lower than the dynamic threshold signal.

Different approaches are available to reset the dynamic threshold signal after it is moved from the initial dynamic threshold signal. For example, the dynamic threshold determining circuit 110 can be configured to reset the dynamic threshold signal to the initial dynamic threshold signal in response to the comparator circuit 120 switching off the injection enable signal. In another approach, the dynamic threshold signal can be held for a time period before being reset. In one such example, the dynamic threshold signal resets to the initial dynamic threshold signal in response to the voltage output signal dropping below the initial dynamic threshold signal so as to maintain a higher level of additional energy being input to correct the transient event as quickly as possible.

Moreover, with reference again to FIG. 1, the circuitry can be adapted to trigger a total system 109 level reset if the voltage output signal does not recover to the target voltage output signal. The voltage output signal's not recovering may be an indication of a larger system problem that the converter circuit 120 cannot self-correct. Because the converter can detect such a problem by detecting a chronically off-set voltage output signal, the converter can be used to trigger the system level reset. For instance, a processing circuit 140 can be configured to determine that the dynamic threshold signal is set at the most modified dynamic threshold signal for a set time and, in response, to initiate a system reset. In other words, if the dynamic threshold signal is moved as far as it can move and there is no recovery for a particular time period, this situation when sensed, a signal is sent to trigger a system level reset. The processor circuit making this determination can be the dynamic threshold determining circuit 120 itself, a separate processor circuit 140, or another circuit within or in communication with the converter circuit 102.

Figure 13:
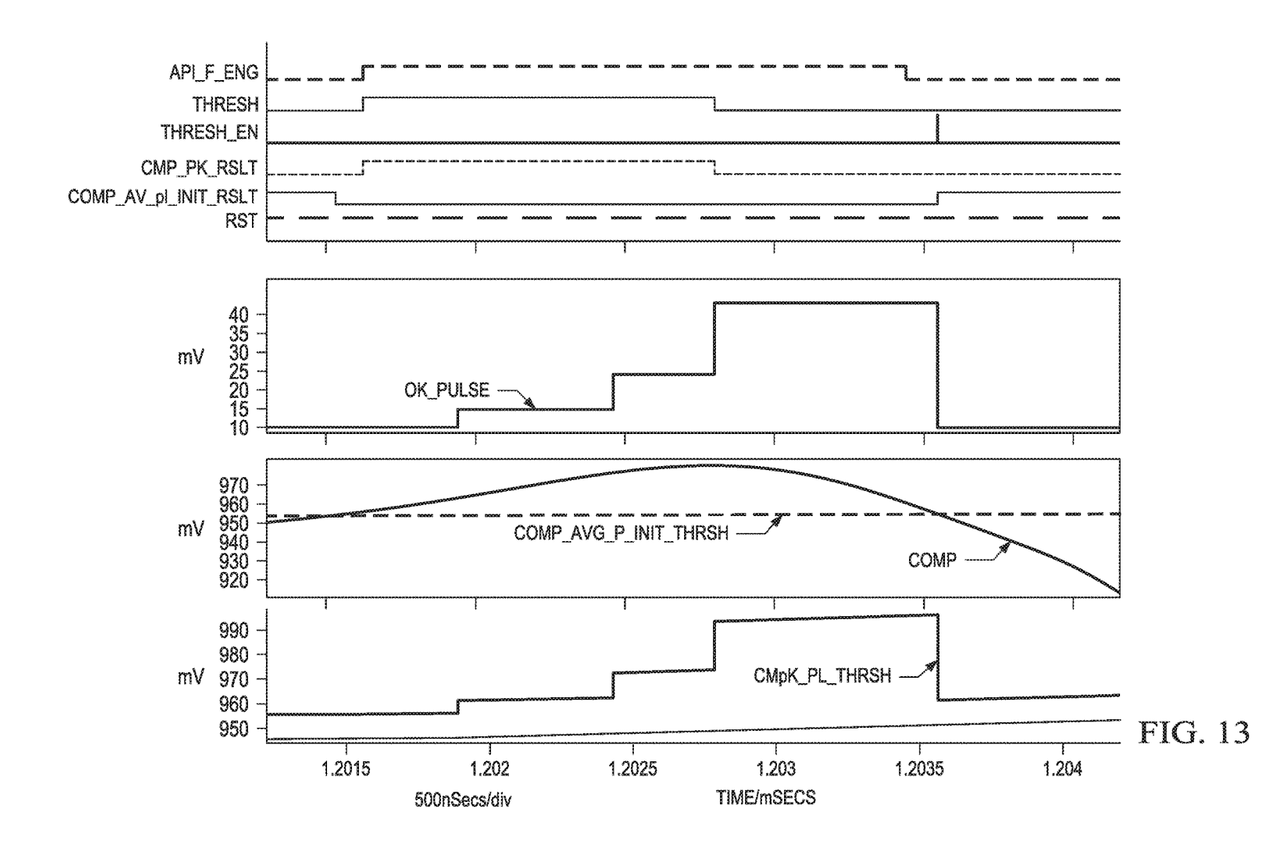
FIG. 13 comprises a graph illustrating various signal levels during an example operation of a circuit in accordance with various embodiments of the invention.
Figure 14:
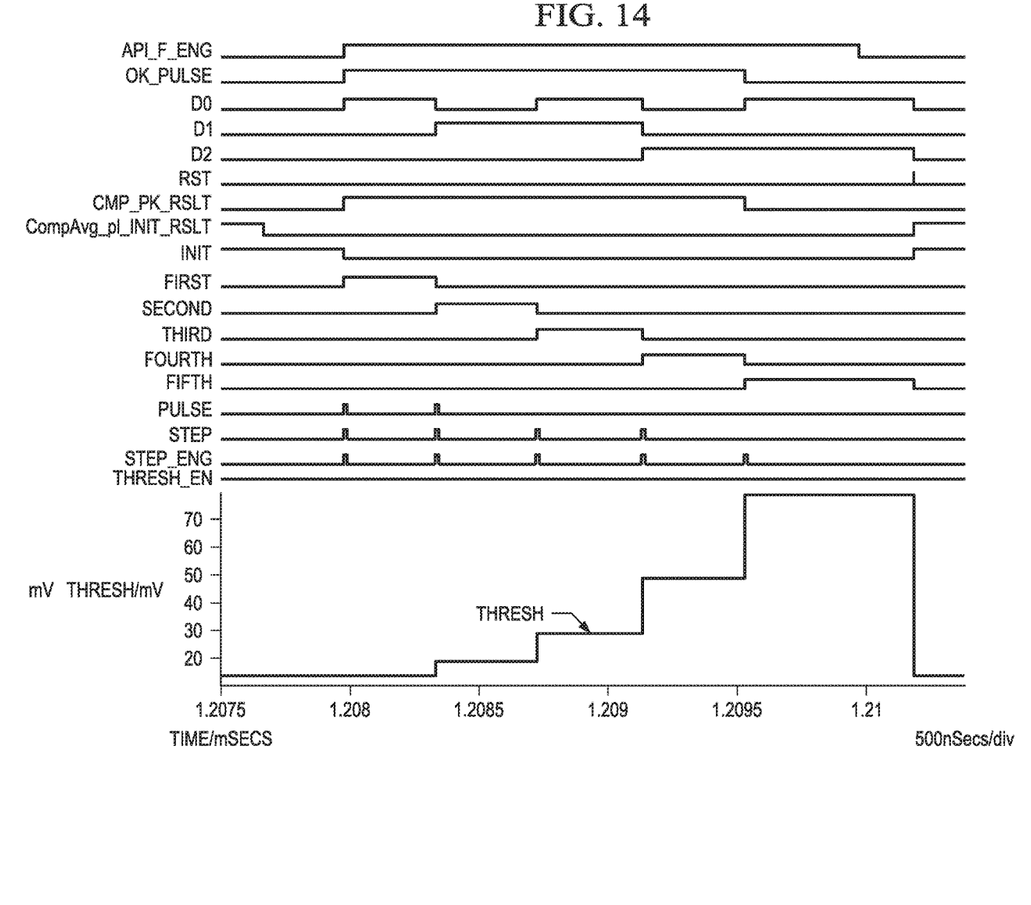
FIG. 14 comprises a graph illustrating various signal levels during an example operation of a circuit in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIGS. 3-12, an illustrative design example for such a platform will now be provided. This example circuit is configured to implement these teachings in an environment that can use either an API (Asynchronous Pulse Injections) scheme or an SPI (Synchronous Pulse Injections) scheme. One of skill in the art can recognize various modifications to these circuits to be API only or SPI only. FIGS. 13 and 14 illustrate graphically the signal values of the various nodes illustrated in FIGS. 3-12 during operation of the circuit and as discussed below. The following table lists the input/output parameters applicable to the FIGS. 3-12.

TABLE 1

| | I/O/ | |
|---|---|---|
| Name | Parameter | Description |
| THRESH_EN | Param | Dynamic Threshold enabled when HIGH, disabled when LOW |
| API_F_ENG | Param | HIGH = API forward engaged, LOW = API forward disengaged |
| COMP | I | Compensation signal from error amplifier |
| STEP_ALT_EN | Param | HIGH = Steps occur on external input, LOW = Steps occur after time delays chosen by the user |
| STEP_ALT | I | Alternate steps (i.e.: SPI, ramp intersects comp) |
| SPI_ON | Param | HIGH = Alternate steps are triggered by the use of SPI, LOW = Alternate steps are not triggered by the use of SPI |
| SS_API | I | Soft Start signal, HIGH = SS is done, LOW = soft start is active |
| INIT_PULSE_EN | Param | HIGH = Pulse injected upon API engaging, LOW = No pulse injected upon API engaging (must be on for INTRSCT method) |
| BP | I | Voltage source |
| Pulse | O | Pulses made based off of the dynamic threshold |

TABLE 1-continued

| | I/O/ | |
|---|---|---|
| Name | Parameter | Description |
| Thresh | O | Threshold value to set API_F_ENG (not utilized here) |
| GND | G | Signal Ground |

Figure 3:
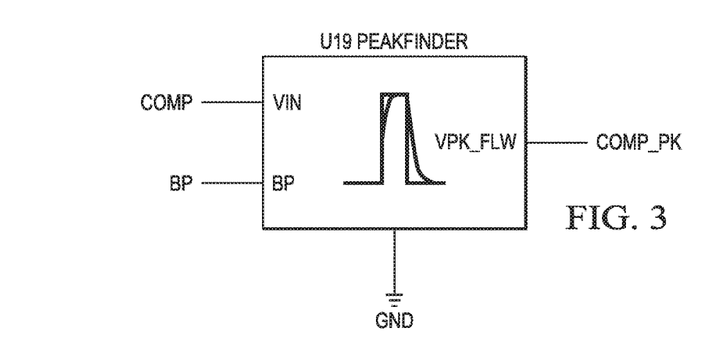
FIG. 3 comprises a block diagram of an example peak finder circuit as used in an example embodiment of the invention.
Figure 4:
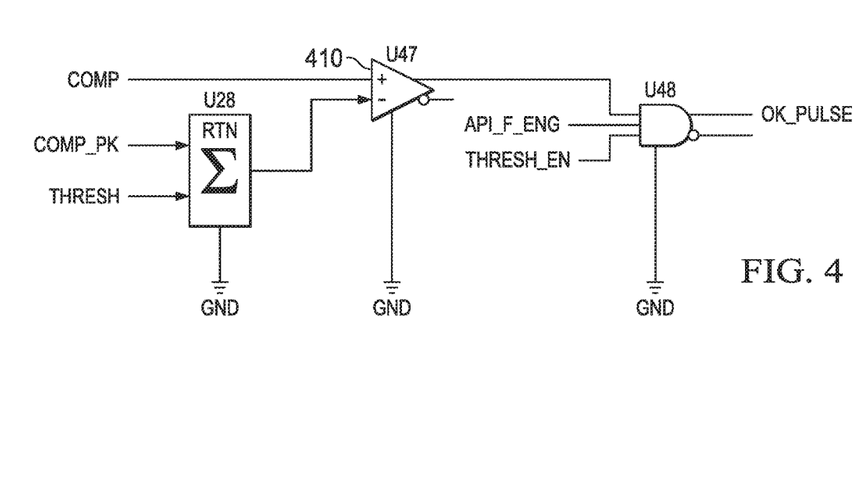
FIG. 4 comprises a circuit portion as used in an example embodiment of the invention.

FIG. 3 illustrates connections for a peak-finder circuit that outputs a compensation peak signal (COMP_PK) used by the circuit of FIG. 4 to determine whether to provide an energy injection pulse. In this example, the determination of injecting energy pulses comes from the comparator 410, which determines whether or not COMP_PK+THRESH (together a dynamic threshold) is greater than COMP at the time an injection is to be made. If COMP_PK+THRESH>COMP and API_F_ENG is HIGH and THRESH_EN is HIGH, then a pulse may be injected because OK_PULSE is then set HIGH, acting as the injection enable signal.

Figure 5:
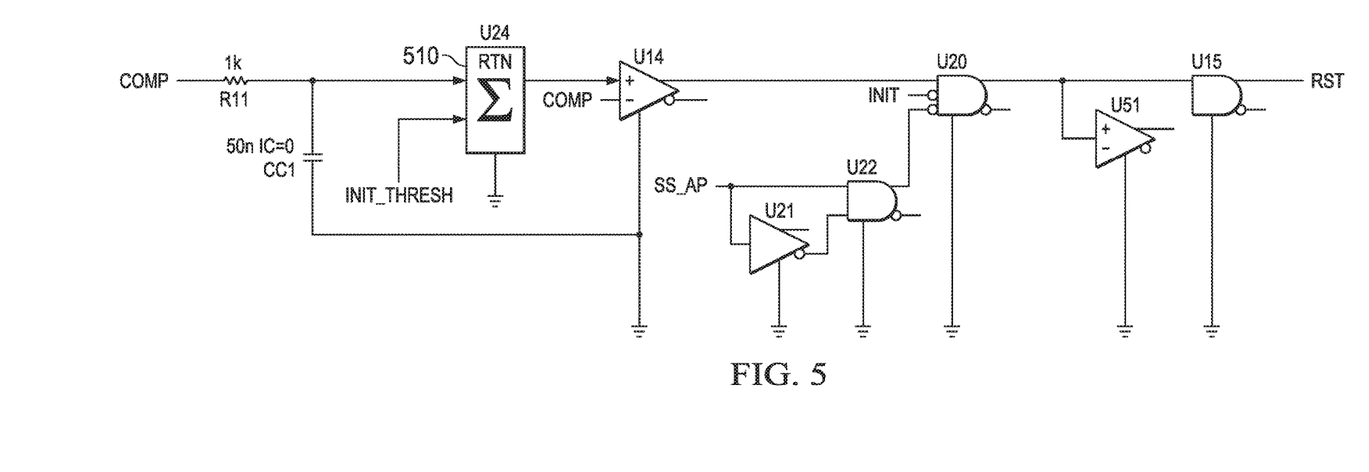
FIG. 5 comprises a circuit portion as used in an example embodiment of the invention.

FIG. 5 illustrates a circuit used to determine when to reset the dynamic threshold signal to the initial dynamic threshold signal. In this portion of the example schematic, the threshold is reset by two methods. The first includes the Comp Average plus an Initial Threshold (provided by summation circuit 510) being below Comp after previously being above Comp. The second includes a soft start feature, which uses Comp Average plus an Initial Threshold below Comp evaluated true. Both cases will only send a reset signal RST if the threshold is not in the initial state because there is no reason to deliver the signal if the current state is already the initial dynamic threshold signal state.

Figure 6:
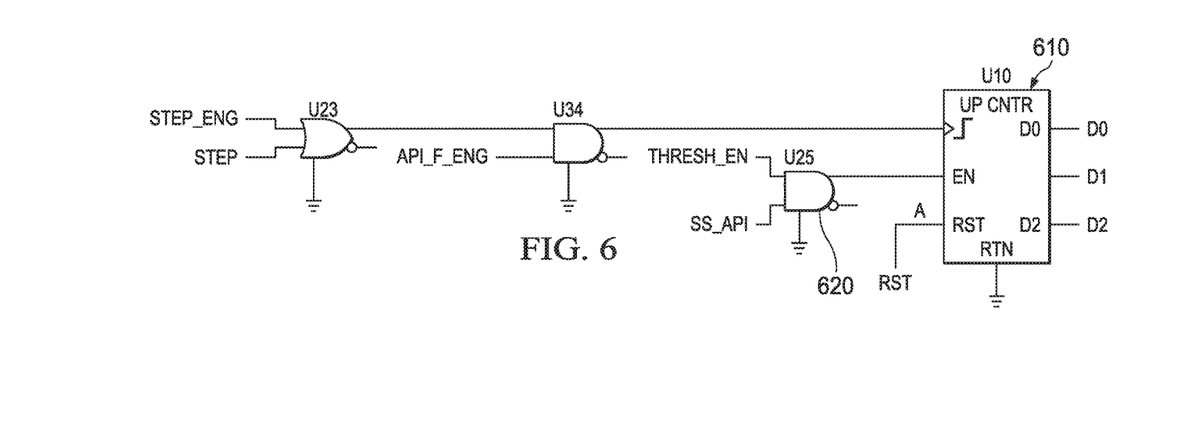
FIG. 6 comprises a circuit portion as used in an example embodiment of the invention.

FIG. 6 illustrates a counter circuit 610 configured to increment in response to consecutive pulses of the additional energy. In this example of a dynamic threshold determining circuit, an up counter 610 is used to move the threshold values. A "step" in the threshold value can be caused by an initial pulse or a step input, which can be pulses injected by ramp intersecting comp, SPI, or the time delay depending upon a user's desired functionality. These "steps" only occur if API_F_ENG is high, i.e., if the API energy injection process is not engaged, no step occurs. To enable this counter 610, THRESH_EN and SS_API must be HIGH as determined through AND gate 620. The resetting of the counter 610 is handled by the logic previously mentioned above with respect to FIG. 5. The outputs of the counter, D0, D1, and D2, are used to determine corresponding levels of the dynamic threshold signal.

Figure 7:
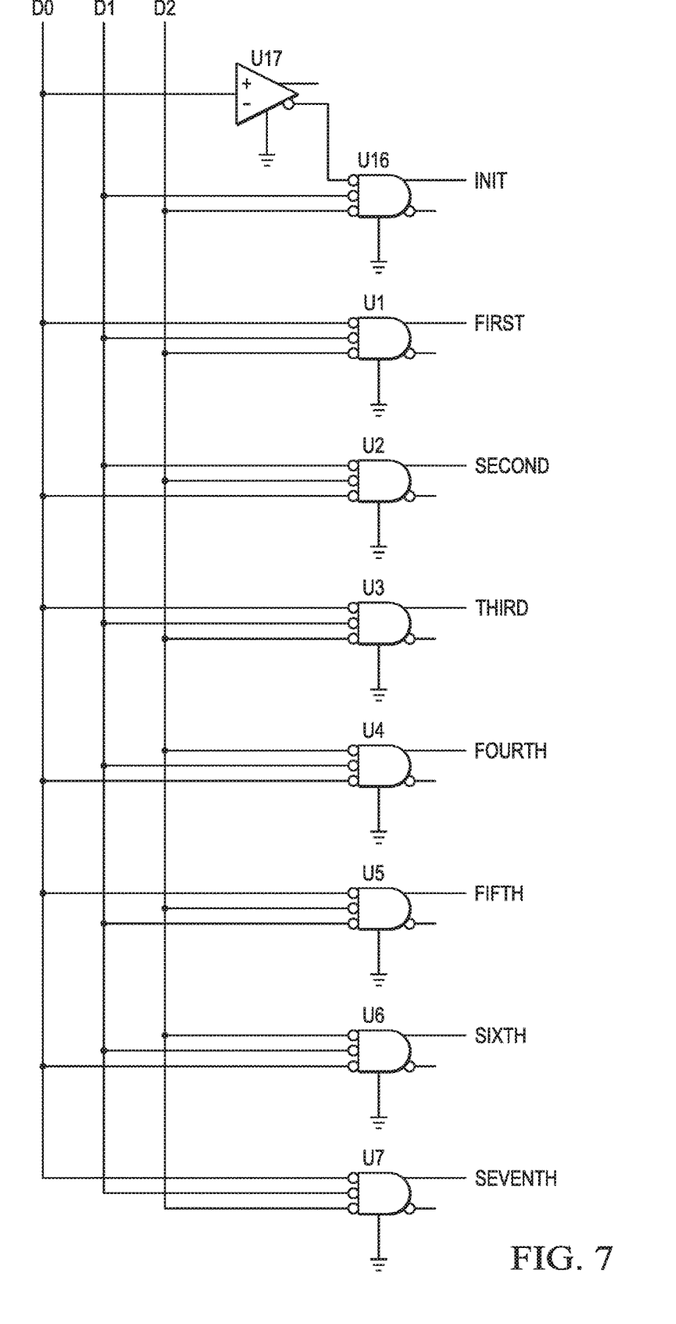
FIG. 7 comprises a circuit portion as used in an example embodiment of the invention.

FIG. 7 illustrates circuit based logic that uses the output from the counter circuit 610 to select the corresponding level of the dynamic threshold signal. In this example, the determination is based off of the order in which D0, D1, and D2 are HIGH/LOW. Here the design is based off of Two's complement 3-bit, where D0|D1|D2:000=INIT (base level), 100=FIRST, 010=Second, . . . , 001=FOURTH, and so on with D0 being the LSB (least significant bit) and D2 being the MSB (most significant bit).

Figure 8:
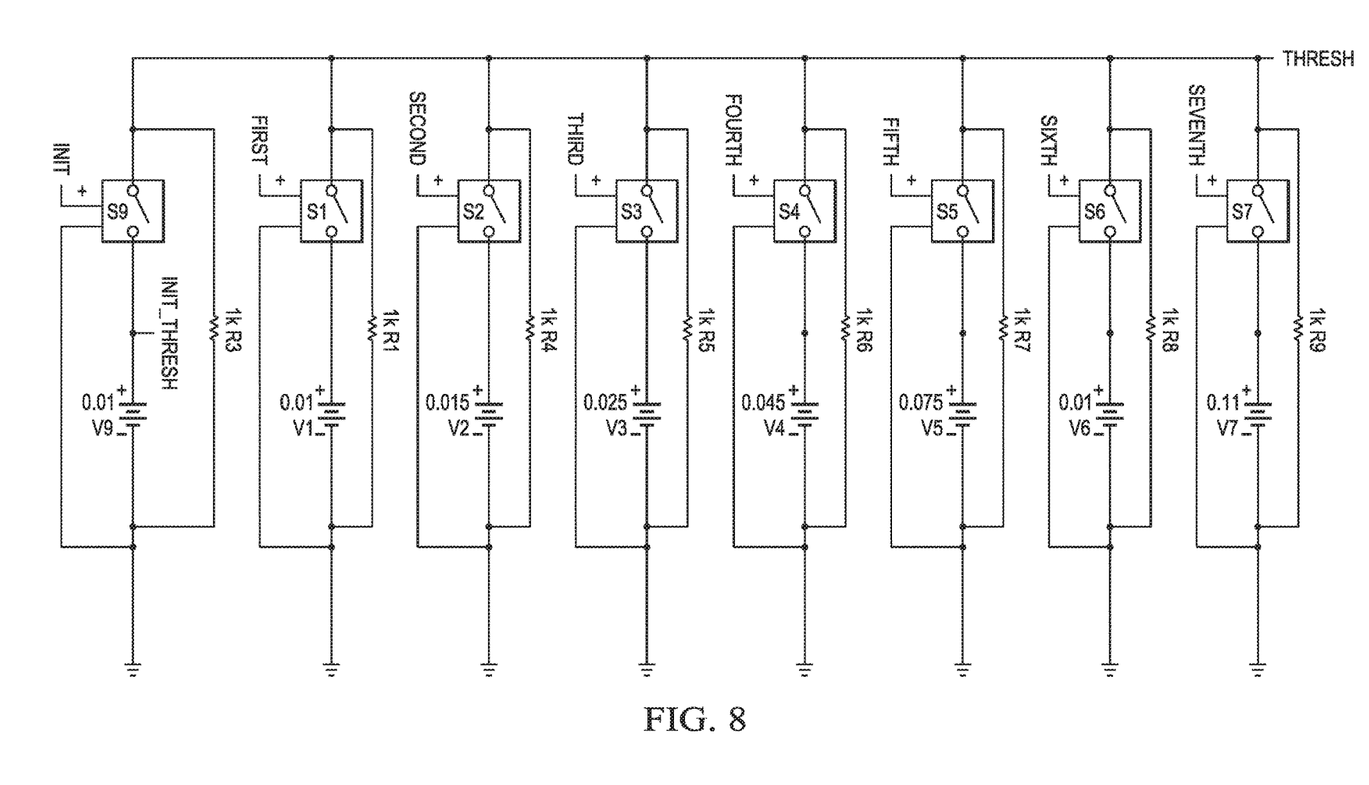
FIG. 8 comprises a circuit portion as used in an example embodiment of the invention.

FIG. 8 illustrates a circuit configured to output the dynamic threshold signal as a particular voltage level. After the corresponding level is selected using the output of the counter circuit 610, the output of the logic of FIG. 7 will then cause the threshold to move by allowing a greater threshold value via switches S1 through S7, which allow a higher voltage to pass through and become the new threshold value.

Here, although the threshold values are moved, the INIT_THRESH remains constant to determine the reset point for the threshold value, i.e., the initial dynamic threshold signal.

Figure 9:
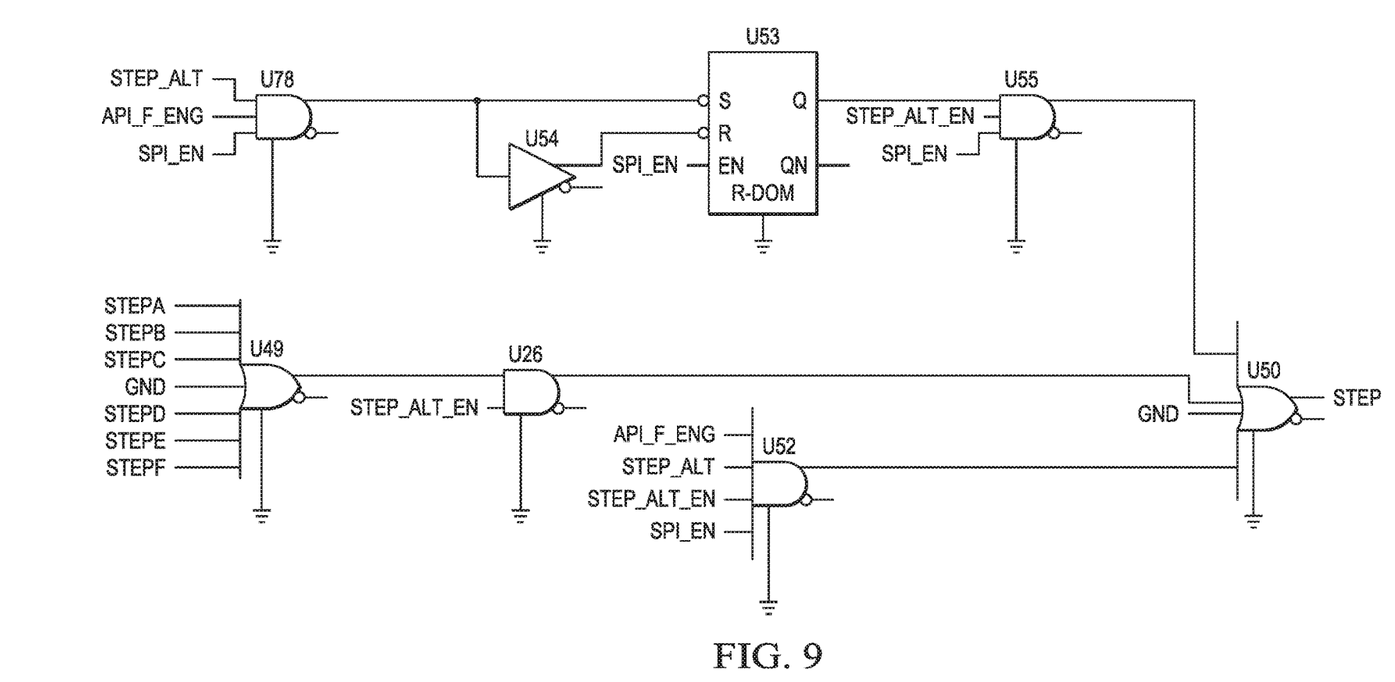
FIG. 9 comprises a circuit portion as used in an example embodiment of the invention.

FIG. 9 illustrates a circuit that determines which of the API or SPI approaches to use for the energy injection method. For the illustrated example of FIGS. 3-12, to cause a step from an external source such as ramp intersecting COMP or SPI, the parameter STEP_ALT_EN must be HIGH. If SPI_EN is HIGH and STEP_ALT_EN is HIGH (meaning SPI will be the chosen alternate method of injecting pulses), then the STEP will occur when an SPI pulse occurs. Similarly, for ramp intersecting COMP, if STEP_ALT_EN is HIGH and SPI_EN is LOW, then steps will occur when ramp intersects COMP. Otherwise if STEP_ALT_EN is LOW but THRESH_EN is HIGH then the STEPS will occur by the chosen time delay pulses which are given by STEPA-STEPF.

Figure 10:
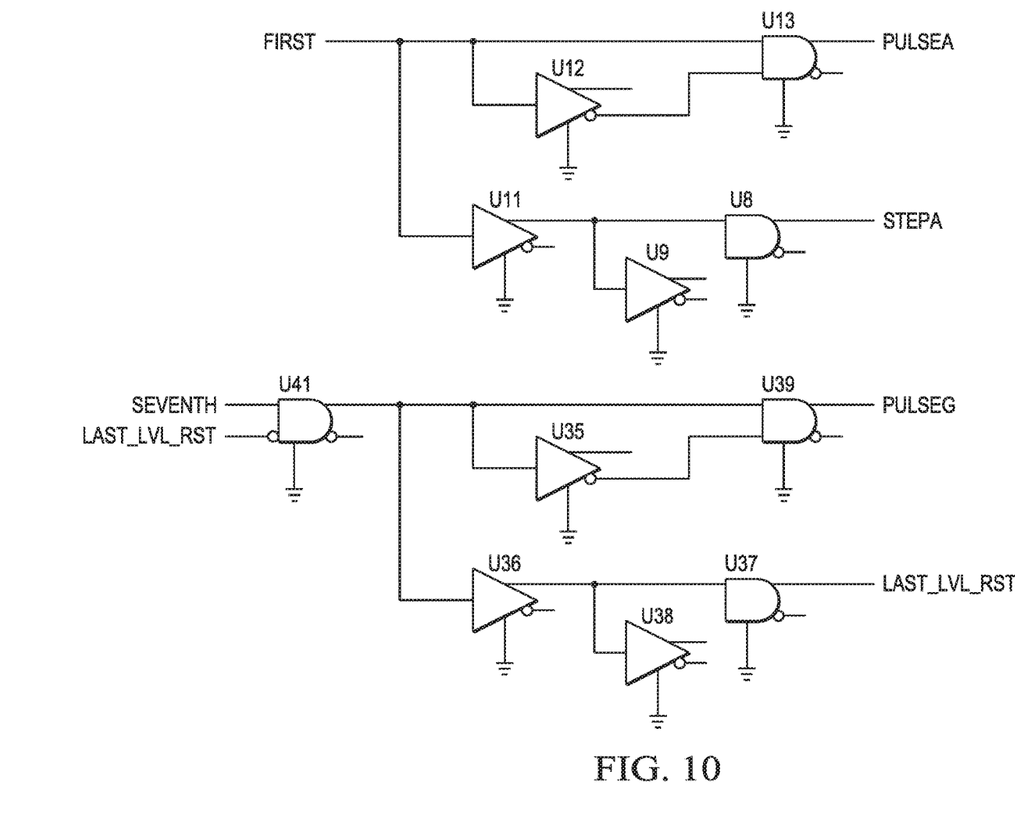
FIG. 10 comprises a circuit portion as used in an example embodiment of the invention.

FIG. 10 illustrates a circuit to control production of two results in response to selecting a threshold level as the circuit steps through different threshold values. First, a pulse is produced by PULSEA-PULSEG, and second, a STEP signal is sent. The STEP signal may have no impact on moving throughout the levels depending upon user design choices. In certain approaches, the increase in threshold could be based on several techniques of sensing the requirement for additional energy. For example, using the COMP signal obtained from an error amplifier as described herein could be used in conjunction with current sensing methods or any arbitrary method to trigger injection of more energy into the system. Furthermore, the step could be made at the time of injection from a synchronous pulse (SPI) with any aforementioned method of sensing the requirement for additional energy.

Figure 11:
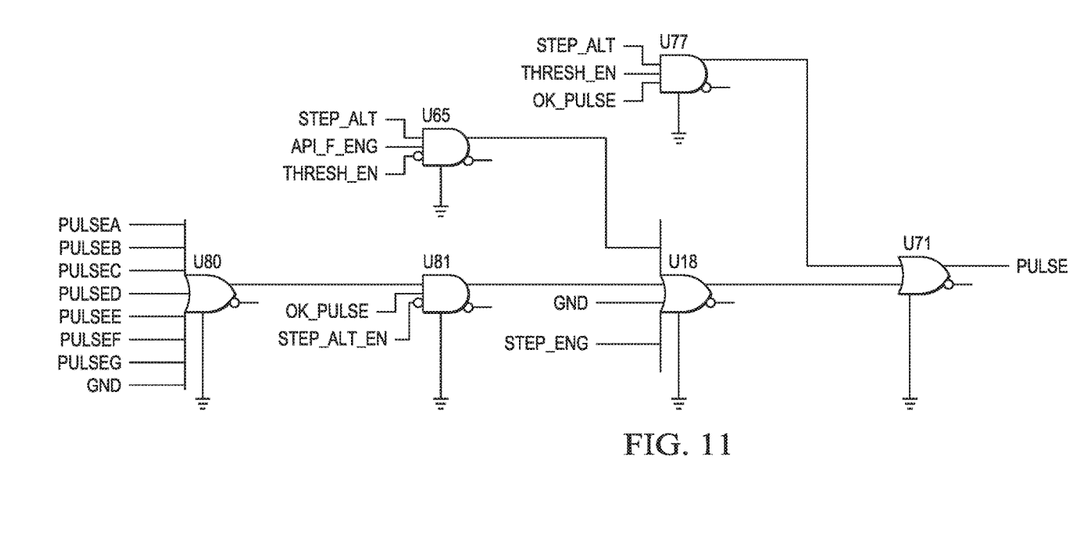
FIG. 11 comprises a circuit portion as used in an example embodiment of the invention.

FIG. 11 illustrates a circuit for handling energy pulses before injection into the voltage output signal circuity. After a pulse is produced it is tested prior to injecting. Pulses are produced either by: SPI, comp intersecting ramp, time delayed pulses, or any method of user input. If THRESH_EN is HIGH and STEP_ALT is HIGH, the intended pulses from outside of this block are then injected if OK_PULSE is HIGH. If THRESH_EN is LOW and STEP_ALT is LOW, the intended pulses from outside of this block are injected if API_F_ENG is HIGH. If STEP_ALT_EN is LOW, then the injected pulses are delivered by the initial pulse in addition to the pulses delivered after a time delay if OK_PULSE is HIGH. STEP_ENG will deliver an immediate pulse into the system; the option for this is set by the INIT_PULS_EN parameter being set high for the method of ramp intersecting comp and the time delay method to work properly.

Figure 12:
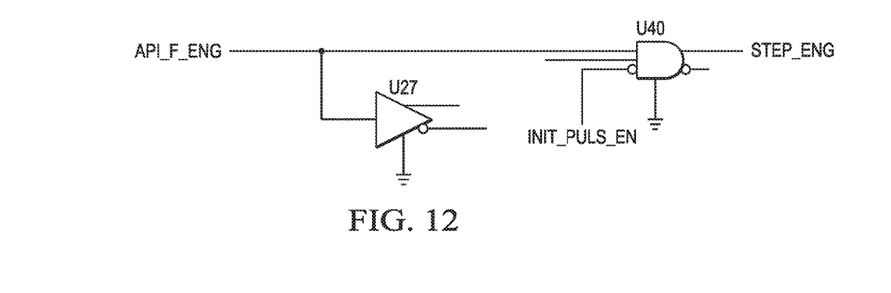
FIG. 12 comprises a circuit portion as used in an example embodiment of the invention.

FIG. 12 illustrates a circuit to handle the initial pulse. Here, STEP_ENG is a pulse that goes HIGH immediately after API_F_ENG goes HIGH. This essentially delivers a pulse immediately upon API engaging. This option can be enabled/disabled via the INIT_PULS_EN parameter. Functionality of this implementation using the STEP_ENG pulse is described with respect to FIG. 11.

In an additional alternative embodiment, the functionality or logic described in above may be embodied in the form of code that may be executed in a separate processor circuit. If embodied in software, each block of functionality or logic may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s). Accordingly, a computer readable medium (being non-transitory or tangible) may store such instructions that are configured to cause a processing device to perform operations as described herein.

Figure 15:
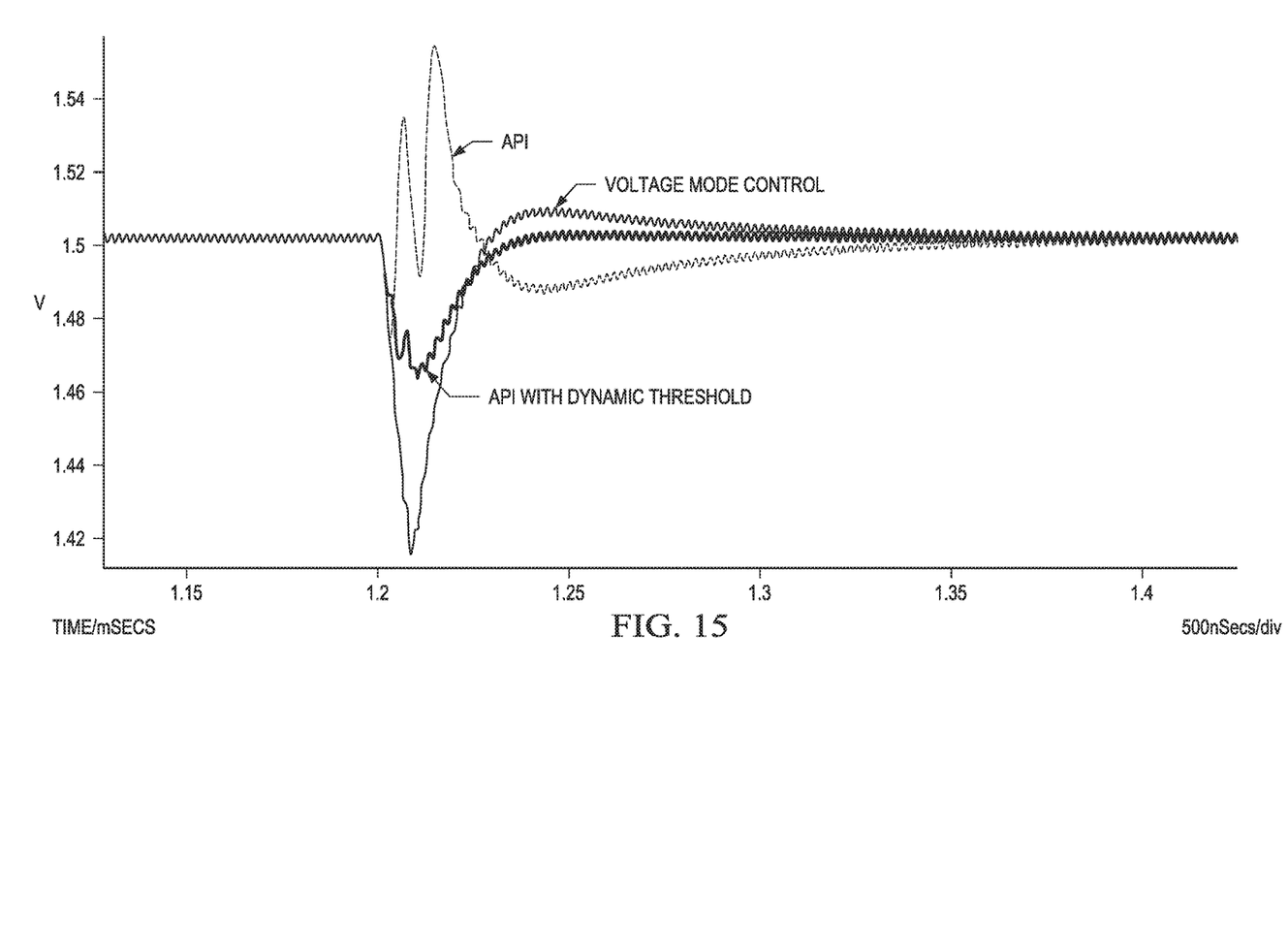
FIG. 15 comprises a graph illustrating performance of different transient correction schemes.

FIG. 15 illustrates a comparison of results of various transient correction methods including a known voltage mode control method, a known API method, and an API method implemented with a dynamic threshold value in accordance with this disclosure. The simulation was done on a correlated behavioral model to reflect actual silicon in terms of the transient response for all examples but for the API with Dynamic Threshold data, which was solely simulation. The simulation was executed using SIMPLIS modelling software. In this comparison, the known voltage mode control method had an undershoot value of 85 mV and an overshoot value of 7 mV. The known API method had an undershoot value of 26 mV and an overshoot value of 51 mV. The API method using a dynamic threshold method had an undershoot value of 37 mV and an overshoot value of 0.8 mV. Thus, use of this dynamic threshold method demonstrated significantly improved undershoot performance as compared to the voltage control mode method and improved overshoot performance as compared to both other previously known approaches.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A circuit for use with or as part of a converter, the circuit comprising:
   a sense circuit to provide a sense signal corresponding to a voltage output of the converter;
   dynamic threshold circuitry to selectably provide stepwise injection thresholds, including at least a first injection threshold, and a last injection threshold,
      the first injection threshold set near a target converter output voltage, so as to account for a pre-defined ripple voltage during normal operation for the converter, and
      each injection threshold after the first injection threshold lower than a preceding injection threshold;
   injection enable circuitry operable
      when the sense signal is lower than the first injection threshold to provide a first injection enable signal, and
      to change the first injection threshold stepwise to a next injection threshold, and
      when the sense signal is lower than the next injection threshold, to provide a next injection enable signal;
   energy injection circuitry responsive to the injection enable signal to cause the injection of additional energy to increase the converter output voltage.

2. The circuit of claim 1 further comprising a processing circuit configured to determine that the injection threshold is set to the last injection threshold for a set time and, in response, to initiate a system reset.

3. The circuit of claim 1 wherein the injection enable circuitry is configured to switch off the injection enable signal when the sense signal is higher than a current injection threshold for a pre-defined period of time.

4. The circuit of claim 3 wherein the dynamic threshold circuitry is configured to change the injection threshold to the first injection threshold when the injection enable circuitry switches off the injection enable signal.

5. The circuit of claim 1 wherein the first injection threshold is set to no more than 10% lower than the target converter output voltage.

6. The circuit of claim 1 wherein the dynamic threshold circuitry comprises a counter circuit configured to increment in response to consecutive pulses of the injected additional energy, and wherein the dynamic threshold circuitry is configured to determine the injection threshold based on a value stored in the counter circuit.

7. The circuit of claim 1 wherein the energy injection circuitry is configured to change the amount of additional energy by changing a voltage or current amount applied or by changing a frequency at which the additional energy is injected.

8. The circuit of claim 1, wherein the sense signal is lower than a stepwise injection threshold is a result of a load transient.

9. A method of controlling a DC to DC switching converter, the method comprising:
generating a sense signal corresponding to a converter output voltage;
selectably providing stepwise injection thresholds, including at least a first injection threshold, and a last injection threshold,
the first injection threshold set near a target converter output voltage, so as to account for a pre-defined ripple voltage during normal operation for the converter, and
each injection threshold after the first injection threshold lower than a preceding injection threshold;
when the sense signal is lower that the first injection threshold:
providing a first injection enable signal,
changing the first injection threshold stepwise to a next injection threshold; and
when the sense signal is lower than the next injection threshold, providing a next injection enable signal; and
responsive to the injection enable signal, injecting additional energy to increase converter output voltage.

10. The method of claim 9 further comprising determining that the injection threshold is set at the last injection threshold for a set time and, in response, initiating a system reset.

11. The method of claim 9 wherein the injection enable signal is switched off when the sense signal is higher than a current injection threshold for a pre-defined period of time.

12. The method of claim 11 wherein the injection threshold is changed to the first injection threshold after switching off the injection enable signal.

13. The method of claim 10 wherein the first injection threshold is set to no more than 10% lower than the target voltage output.

14. The method of claim 9 wherein the injection threshold is set by a counter circuit configured to increment in response to consecutive pulses of the injected additional energy, and wherein the injection threshold is determined based on a value stored in the counter circuit.

15. The method of claim 9 wherein the amount of additional energy is changed by changing a voltage or current amount applied or by changing a frequency at which the additional energy is injected.

16. The method of claim 9, wherein the sense signal is lower than a stepwise injection threshold is a result of a load transient.

17. A DC to DC voltage converter for use in a switched mode power supply system to provide a regulated voltage output to a load, the circuit comprising:
a sense circuit to provide a sense signal corresponding to the voltage output of the converter;
dynamic threshold circuitry to selectably provide stepwise injection thresholds,
including at least a first injection threshold, and a last injection threshold,
the first injection threshold set near a target converter output voltage, so as to account for a pre-defined ripple voltage during normal operation for the converter, and
each injection threshold after the first injection threshold lower than a preceding injection threshold;
injection enable circuitry operable, in response to a load transient:
when the sense signal is lower than the first injection threshold to provide a first injection enable signal, and
to change the first injection threshold stepwise to a next injection threshold, and
when the sense signal is lower than the next injection threshold, to provide a next injection enable signal;
energy injection circuitry responsive to the injection enable signals to cause the injection of additional energy to increase the converter output voltage.

18. The converter of claim 17 further comprising a processing circuit configured to determine that the injection threshold is set to the last injection threshold for a set time and, in response, to initiate a system reset.

19. The converter of claim 17 wherein the dynamic threshold circuitry is configured to change the injection threshold to the first injection threshold when the injection enable circuitry switches off the injection enable signal.

20. The converter of claim 17 wherein the first injection threshold is set to no more than 10% lower than the target converter output voltage.

21. The converter of claim 17 wherein the energy injection circuitry is configured to change the amount of additional energy by changing a voltage or current amount applied or by changing a frequency at which the additional energy is injected.

* * * * *